(12) United States Patent
Wyrwas et al.

(10) Patent No.: US 10,157,305 B2
(45) Date of Patent: Dec. 18, 2018

(54) COVER-GLASS OPTICAL ISOLATION FOR OPTICAL TOUCH AND FINGERPRINT SENSING

(71) Applicant: QUALCOMM Incorporated, San Diego, CA (US)

(72) Inventors: John Wyrwas, Mountain View, CA (US); Khurshid Alam, Mountain View, CA (US); Evgeni Gousev, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 15/295,936

(22) Filed: Oct. 17, 2016

(65) Prior Publication Data

US 2017/0109561 A1 Apr. 20, 2017

Related U.S. Application Data

(60) Provisional application No. 62/243,517, filed on Oct. 19, 2015.

(51) Int. Cl.
*G06K 9/00* (2006.01)
*G06F 3/042* (2006.01)
(Continued)

(52) U.S. Cl.
CPC ......... *G06K 9/00053* (2013.01); *G06F 3/042* (2013.01); *G06F 3/044* (2013.01);
(Continued)

(58) Field of Classification Search
CPC .................. G06K 9/00013; G06K 9/00046
See application file for complete search history.

(56) References Cited

U.S. PATENT DOCUMENTS 6,901,165 B1 5/2005 Egger et al.
2005/0129291 A1 6/2005 Boshra
(Continued)

FOREIGN PATENT DOCUMENTS

EP          1835443 A1   9/2007
KR    20090073470 A   7/2009
(Continued)

OTHER PUBLICATIONS

International Search Report and Written Opinion—PCT/US2016/057486—ISA/EPO—dated Jan. 16, 2017.

*Primary Examiner* — Utpal D Shah
(74) *Attorney, Agent, or Firm* — Kilpatrick Townsend & Stockton, LLP

(57) ABSTRACT

Methods, systems, computer-readable media, and apparatuses for cover-glass optical isolation for optical touch and fingerprint sensing are presented. One disclosed display assembly includes a cover glass layer; a low refractive index (LRI) layer coupled to a surface of the cover glass layer; a display layer coupled to the LRI layer; a prism structure; and a camera comprising an image sensor optically coupled to the prism structure to capture an image of a fingerprint based on light reflected from a fingertip and propagated within the cover glass layer and directed towards the camera using the prism structure, wherein the cover glass layer defines an overhang region that extends beyond the LRI layer and the display layer, and wherein the prism structure is coupled to the surface of the cover glass layer on the overhang region.

30 Claims, 8 Drawing Sheets

(51) Int. Cl.
*G06F 3/044* (2006.01)
*G06F 3/041* (2006.01)
*G06F 21/32* (2013.01)

(52) U.S. Cl.
CPC .......... *G06F 3/0412* (2013.01); *G06F 3/0421* (2013.01); *G06F 21/32* (2013.01); *G06K 9/0004* (2013.01); *G06K 9/00006* (2013.01); *G06K 9/00013* (2013.01); *G06K 9/00046* (2013.01); *G06K 9/00087* (2013.01); *G06F 2203/0338* (2013.01)

(56) References Cited

U.S. PATENT DOCUMENTS

| | | |
|---|---|---|
| 2007/0217660 A1 | 9/2007 | Komura et al. |
| 2008/0253625 A1 | 10/2008 | Schuckers et al. |
| 2009/0128499 A1 | 5/2009 | Izadi et al. |
| 2009/0285459 A1 | 11/2009 | Aggarwal et al. |
| 2013/0092838 A1* | 4/2013 | Weber .................. G01J 1/0407 250/353 |
| 2014/0028629 A1* | 1/2014 | Drumm ................ G06F 3/0308 345/175 |
| 2014/0098306 A1 | 4/2014 | King et al. |
| 2014/0192023 A1 | 7/2014 | Hoffman |
| 2015/0253931 A1 | 9/2015 | Wyrwas et al. |
| 2015/0317034 A1 | 11/2015 | Kent et al. |
| 2015/0331545 A1* | 11/2015 | Wassvik ................ G06F 3/042 345/173 |
| 2015/0331546 A1 | 11/2015 | Craven-Bartle et al. |
| 2015/0347804 A1 | 12/2015 | Feng et al. |
| 2016/0116664 A1 | 4/2016 | Wheatley et al. |
| 2016/0283772 A1 | 9/2016 | Nelson |
| 2017/0079591 A1 | 3/2017 | Gruhlke et al. |
| 2017/0109564 A1 | 4/2017 | Seo et al. |

FOREIGN PATENT DOCUMENTS

| | | |
|---|---|---|
| WO | 2015005959 A1 | 1/2015 |
| WO | 2015140600 A1 | 9/2015 |

\* cited by examiner

COVER-GLASS OPTICAL ISOLATION FOR OPTICAL TOUCH AND FINGERPRINT SENSING

CROSS-REFERENCE TO RELATED APPLICATIONS

This application claims the benefit of U.S. Provisional Application No. 62/243,517, filed Oct. 19, 2015, entitled "Cover-Glass Optical Isolation for Optical Touch and Fingerprint Sensing" which is incorporated herein by reference in its entirety.

BACKGROUND

Fingerprints and other types of biometric authentication are considered more secure than PIN-based passwords and can eliminate issues such as password theft. Furthermore, biometrics can be more convenient and faster than typing passwords. However, there are some issues with existing fingerprint sensors. For example, the sensor component and its sensing area take up "real estate" on the front face of the mobile device. This limits how much of the front face of the device the display can occupy, and thus limits the overall display and phone dimensions. This can lead to tradeoffs between display size and fingerprint sensor size, but a smaller sensing area may cause user authentication to be less accurate, and lead to more erroneous authentication failures. Additionally, the user experience is interrupted by the authentication process when the user is interacting with applications. For example, to confirm a payment or log into an account, the device must prompt the user to move his or her finger off the touch-screen of the display, touch the fingerprint reader, and then resume the previous task.

BRIEF SUMMARY

Various examples are described for cover-glass optical isolation for optical touch and fingerprint sensing. On example display assemble includes a cover glass layer; a low refractive index (LRI) layer coupled to a surface of the cover glass layer; a display layer coupled to the LRI layer; a prism structure; and a camera comprising an image sensor optically coupled to the prism structure to capture an image of a fingerprint based on light reflected from a fingertip and propagated within the cover glass layer and directed onto the camera using the prism structure, wherein the cover glass layer defines an overhang region that extends beyond the LRI layer and the display layer, and wherein the prism structure is coupled to the surface of the cover glass layer on the overhang region.

One example computing device includes a non-transitory computer-readable medium; a processor in communication with the non-transitory computer-readable medium; and a display assembly in communication with the processor, the display assembly comprising: a cover glass layer; a low refractive index (LRI) layer coupled to a surface of the cover glass layer; a display layer coupled to the LRI layer; a prism structure; and a camera comprising an image sensor optically coupled to the prism structure to capture an image of a fingerprint based on light reflected from a fingertip and propagated within the cover glass layer and directed onto the camera using the prism structure, wherein the cover glass layer defines an overhang region that extends beyond the LRI layer and the display layer, and wherein the prism structure is coupled to the surface of the cover glass layer on the overhang region.

One example apparatus includes means for propagating light within a display assembly; means for capturing an image based on light received from the means for propagating light within a display assembly; means for directing the propagating light onto the means for capturing an image coupled to the surface of an overhang region of the means for propagating light; and a means for displaying coupled to the means for propagating light.

One example method includes providing a display and a cover glass; applying a low refractive index (LRI) layer to a first portion of a surface of the cover glass; coupling the display to the LRI layer using at least one of an optically-clear resin (OCR) or an optically-clear adhesive (OCA), wherein coupling the display to the LRI layer defines an overhang region of the cover glass; coupling a first surface of a prism structure to the surface of the cover glass on the overhang region; positioning a camera adjacent to a second surface of the prism structure, the camera comprising an image sensor, and orienting the camera to position the image sensor to capture light propagating through the second surface of the prism structure.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of cover-glass optical isolation for optical touch and fingerprint sensing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with applicationand business-related constraints, and that these specific goals will vary from one implementation to another and from one developer to another.

Figure 1:
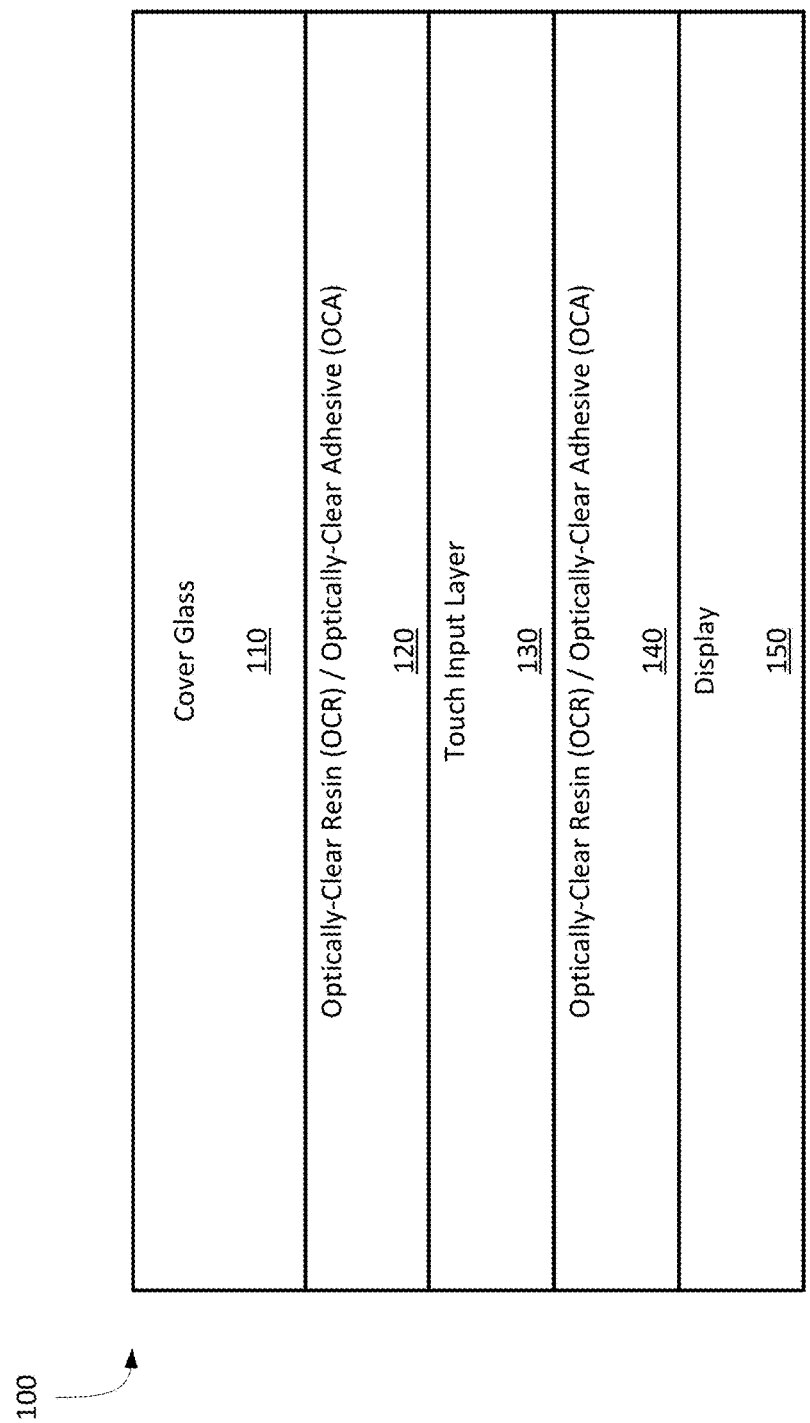
FIG. 1 shows a traditional touch-sensitive display assembly for a computing device.

Illustrative Example of Cover-Glass Optical Isolation for Optical Touch and Fingerprint Sensing Referring now to FIG. 1, FIG. 1 shows a traditional touch-sensitive display assembly 100 for a computing device. The display assembly 100 includes several layers that are coupled to each other by resins or adhesives. The layers in this example are a cover glass layer 110, which is exposed to the user to allow the user to use touch to interact with the associated computing device. The cover glass layer 110 is bonded to a touch input layer 130, such as a capacitive sensor or other means for touch input, using an optically-clear resin (OCR) or optically-clear adhesive (OCA) layer 120. The touch input layer 130 is in turn bonded to a display layer 150 by another OCR or OCA layer 140. The various layers above the display layer 150 are substantially transparent to enable light emitted by the display layer 150, e.g., by a backlight, to be viewed by the user of the computing device. It should be noted that the layers of FIG. 1 are not shown to scale.

Figure 2:
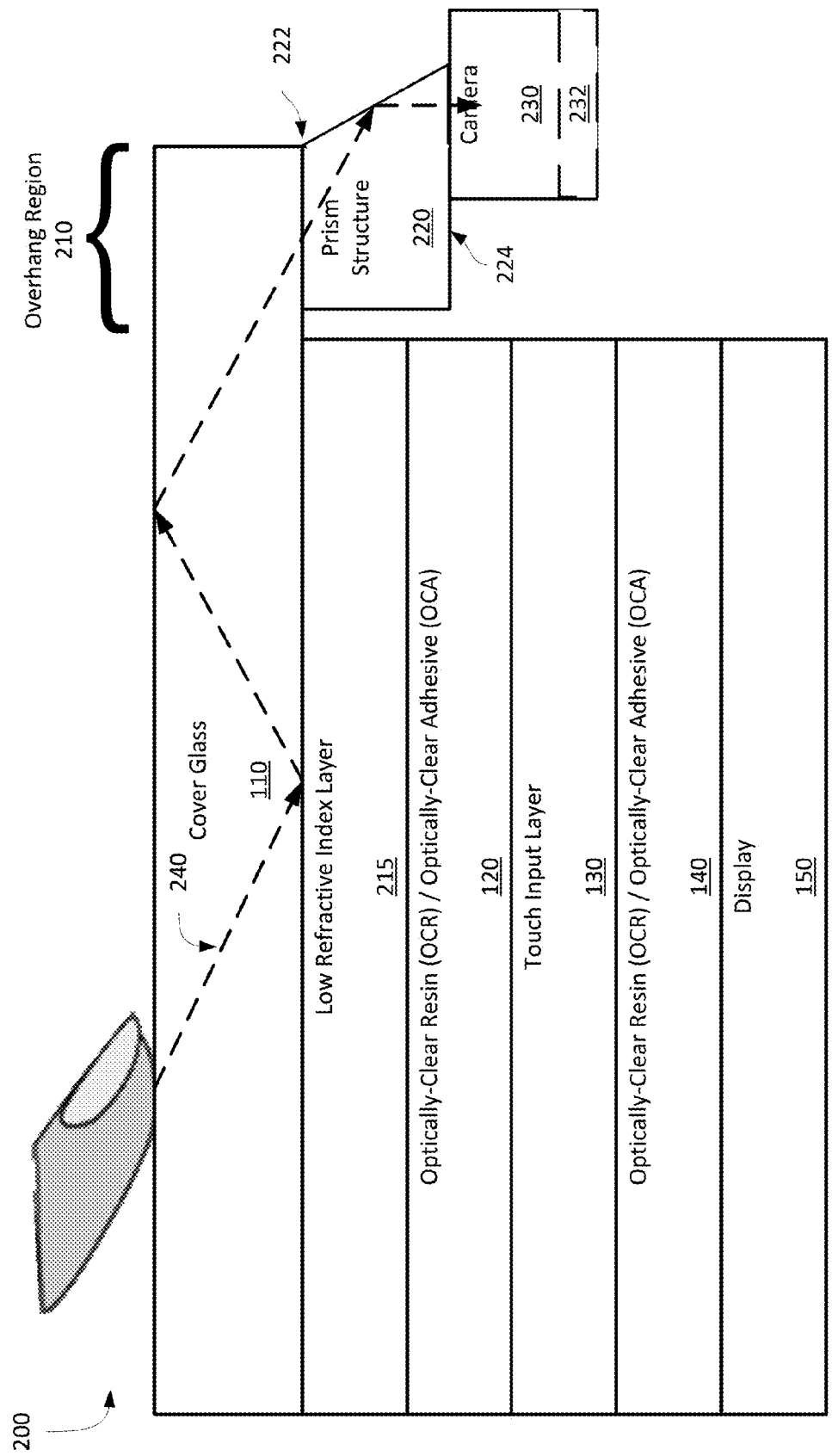
FIGS. 2-4 show an example display assembly for cover-glass optical isolation for optical touch and fingerprint sensing according to the present disclosure.

Referring now to FIG. 2, FIG. 2 shows an example display assembly 200 for cover-glass optical isolation for optical touch and fingerprint sensing according to the present disclosure. In the example shown in FIG. 2, the display assembly 200 includes a display layer 150 coupled to a lower surface of a touch input layer 130 by an OCR or OCA layer 140. In this example, the upper surface of the touch input layer 130 is coupled to a lower surface of a low refractive index (LRI) layer 215 by another OCR or OCA layer 120. An upper surface of the LRI layer 215 is in turn coupled to a lower surface of the cover glass 110. As may be seen, however, the cover glass 110 has a length or width dimension that is greater than a corresponding length or width dimension of the LRI layer 215 and the other layers 120-150, which creates an overhang region 210.

In this example, an upper surface of a prism structure 220, or other means for directing light from the cover glass layer 110 onto the camera 230, is coupled to the lower surface of the cover glass 110 within the overhang region 210. Another surface of the prism structure 220 is coupled to a camera 230 such that a sensor of the camera 230 is oriented in a plane substantially parallel to a second surface 224 of the prism structure 220. In some examples, however, the sensor of the camera 230 may be oriented in a plane that is not parallel to the second surface 224 of the prism structure 220, or a lens of the camera 230 may not be oriented along an axis parallel to the image sensor, to make use of the Scheimpflug effect. For example, the camera 230 may be tilted with respect to the second surface 224 of the prism structure 220 at an angle of approximately 5 degrees from parallel. In some examples, the camera 230 may be tilted at an angle of up to 20 degrees from a plane parallel to the second surface 224 of the prism structure 220.

In the example display assembly 200 of FIG. 2, the coupling of the LRI layer 215 with the cover glass 110 may cause certain light rays to reflect from the cover glass/LRI layer boundary and to propagate within the cover glass 110 via internal reflection within the cover glass 110. By selecting an LRI layer 215 with a refractive index lower than the refractive index of the cover glass 110, some of the light rays that would ordinarily propagate across the boundary between the cover glass 110 and the adjoining OCR/OCA layer 120 of the display assembly 100 in FIG. 1 instead reflect internally within the cover glass 110. For example, if a user touches the cover glass 110 with a fingertip, a light ray 240, e.g., emitted by the display or a backlight or from an ambient light source, may reflect from the fingertip and propagate towards the LRI layer 215. Upon reaching the cover glass/LRI layer boundary, the light ray 240 reflects internally within the cover glass 110 due to the angle of incidence with the cover glass/LRI layer boundary. The light ray 240 then propagates within the cover glass 110 due to total internal reflection at the upper and lower boundary surfaces of the cover glass 110.

As it propagates, the light ray 240 may ultimately strike the cover glass/prism boundary 222. If the angle of incidence between the light ray 240 and the cover glass/prism boundary 222 is sufficient to allow the light ray 240 to propagate across the cover glass/prism boundary 222, the light ray 240 will propagate through the prism structure 220 and into the camera 230, where it strikes the camera's sensor. Thus, the camera 230 may be able to capture an image of a user's fingertip, and thereby the user's fingerprint, while it is in contact with the cover glass without providing a separate dedicated region for capturing an image of the user's fingerprint. After capturing the image, the camera 230 may provide the captured image to a computing device to authenticate the user based on the image of the fingerprint. Such a display assembly 200 may allow a device to unobtrusively authenticate a user that is interacting with the device. In certain examples, a display assembly means may include layers 110-150 and 215 as described above or may comprise, in addition, the prism structure 220 and camera 230 as described above. However, in other examples, a display assembly means may not include a touch input layer 130 or other means for touch input. In some examples, the display assembly means may include a means for propagating light that includes a cover glass layer 110 and a LRI layer 215.

In the example display assembly 200 of FIG. 2, the LRI layer 215 comprises an LRI material having a refractive index lower than the refractive index of the cover glass 110. For example, a suitable difference between the refractive index of the LRI layer 215 and the cover glass 110, referred to as a "refractive delta," may be 0.09 or greater. In one example, if the cover glass 110 has a refractive index of approximately 1.5, a suitable LRI material may have a refractive index of approximately 1.41 or less. However, in some examples, an LRI material may be selected to provide refractive delta of 0.09, 0.10, 0.14, 0.15, 0.17, or 0.18. In examples where the cover glass 110 has a refractive index of approximately 1.50 or 1.51, suitable LRI materials may have a refractive index between approximately 1.30 and 1.41. For example, a silicone coating having a refractive index of approximately 1.41 that is applied to the cover glass 110 may be a suitable LRI material and function as a suitable LRI layer. In some examples, suitable LRI materials may have a refractive index of approximately one or more of the following: 1.30, 1.31, 1.32, 1.33, 1.34, 1.35, 1.36, 1.37, 1.38, 1.39, 1.40, or 1.41. In some examples, suitable LRI materials may have a refractive index less than 1.30.

In some examples, other suitable materials may be used, such as one or more of Teflon fluoropolymer such as fluorinated ethylene propylene or a siloxane polymer. Additional polymers suitable for an LRI layer 215 in example assemblies according to this disclosure include one or more of poly-tert-butyl methacrylate-co-glycidyl methacrylate, poly-difluoro-bistrifluoromethyl-dioxole-co-tetrafluoroethylene, poly-heptafluorobutyl acrylate, poly-heptafluorobutyl methacrylate, poly-heptafluorobutyl methacrylate-co-glycidyl methacrylate, poly-hexafluorobutyl acrylate, poly-hexafluorobutyl methacrylate, poly-hexafluorobutyl methacrylate-co-glycidyl methacrylate, poly-hexafluoroisopropyl acrylate, poly-hexafluoroisopropyl methacrylate, poly-hexafluoroisopropyl methacrylate-co-glycidyl methacrylate, poly-pentafluoropropyl acrylate), poly-pentafluoropropyl methacrylate, poly-pentafluoropropyl methacrylate-co-glycidyl methacrylate, poly-pentafluorostyrene, poly-pentafluorostyrene-co-glycidyl methacrylate, poly-tetrafluoropropyl acrylate, poly-tetrafluoropropyl methacrylate, poly-tetrafluoropropyl methacrylate-co-glycidyl methacrylate, poly-trifluoroethyl acrylate, poly-trifluoroethyl methacrylate, or poly-trifluoroethyl methacrylate-co-glycidyl methacrylate.

Some monomers suitable for an LRI layer 215 in example assemblies according to this disclosure include one or more of heptafluorobutyl acrylate, heptafluorobutyl methacrylate, hexafluorobutyl acrylate, hexafluorobutyl methacrylate, hexafluoroisopropyl acrylate, hexafluoroisopropyl methacrylate, methyl methacrylate, pentafluoropropyl acrylate, pentafluoropropyl methacrylate, tetrafluoropropyl methacrylate, trifluoroethyl acrylate, or trifluoroethyl methacrylate.

In the example shown in FIG. 2, the LRI layer 215 has a thickness of less than 10 microns. However, in some examples, a suitable LRI layer 215 may be thicker. For example, a suitable LRI layer 215 may has a thickness of approximately 85 to 115 microns. In other examples, a suitable LRI layer 215 may have a thickness of 10 to 85 microns or greater than 115 microns. In further examples, and with reference to FIG. 4, a suitable LRI layer 215 may have a thickness based on a thickness of a substantially opaque mask applied to the cover glass, such as cover glass mask 410, which is described in more detail below. For example an LRI layer 215 may have a thickness that is substantially the same thickness as the cover glass mask 410, which may provide a substantially uniform planar mating between the LRI layer 215 and the cover glass 110 where such materials do not overlap.

These and other LRI layer means may be employed in different examples according to this disclosure.

In the example display assembly 200 shown in FIG. 2, the cover glass 110 may be glass or another suitable material, such as sapphire. In some examples, a suitable material for the cover glass 110 may be selected to increase the refractive delta for the display assembly 200 given a selected LRI material for the LRI layer 215. For example, a suitable material may be selected to establish a refractive delta of 0.09 or greater for a selected LRI material or cover glass material.

A suitable LRI layer 215 may be applied as a tape or lamination or by dip coating or spin-on coating. For example, a suitable tape may comprise a silicone adhesive. Further, the size or different dimensions of a display assembly may affect the application of the LRI layer. For example, an LRI layer for a display assembly sized for a handheld device may be applied using a dip coating or spin-on coating, while an LRI layer for a larger display, such as for a computer monitor or television, may be applied using a silicone adhesive.

While the example display assembly shown in FIG. 2 comprises only one touch input layer, in some examples, a plurality of touch input layers may be included in a display assembly. In some such examples, the plurality of touch input layers may be coupled to each other using an OCA or OCR material, or may be interspersed by one or more other layers.

In this example, the prism structure 220 comprises a material having a refractive index approximately equal to the refractive index of the cover glass 110. A suitable material may comprise a refractive index having a refractive index within a range of about 0.02 greater or less than the refractive index of the cover glass 110. Thus, the prism structure may allow light to propagate into the prism structure 220 with only a small change in angle. In this example, the prism structure 220 comprises a trapezoidal cross section with the upper and lower surfaces of the prism structure are substantially parallel, and a third side of the prism structure 220 having an interior angle of intersection of the approximately 55 degrees with the lower surface of the prism structure. An example of such a prism structure 220 is shown in FIG. 2. The third side of the prism structure 220 is configured with a mirror, e.g., metallized, finish applied to the optically-smooth third side of the prism structure 220. Thus light propagating into the prism structure 220 from the cover glass 110 may strike the mirrored third side of the prism structure and be reflected towards a sensor within the camera 230. In some examples, the interior angle of intersection of the third side and lower surface of the prism structure 220 may be different from 55 degrees based on the desired angle of total-internal reflection of the cover glass based on the LRI layer 215 or design constraints related to sizing of a device having the display assembly 200.

In some examples, the prism structure 220 may comprise a material having a refractive index substantially higher than the cover glass 110. For example, the prism structure 220 may comprise a material such as titanium dioxide or gadolinium gallium garnet (GGG). Such a prism structure 220 may be capable of redirecting light rays from the cover glass 110 onto a camera's sensor either without a mirror finish applied to one of the prism surfaces, or using a different interior angle of intersection of one of the sides of the prism structure 220 and a lower surface of the prism structure 220 based on the difference in refractive index between the cover glass 110 and the prism structure 220. In some examples, such a prism structure 220 may comprise a triangular cross section, such as a cross section having a right triangle.

The camera 230 comprises an image sensor, such as a CMOS image sensor, a charge-coupled device (CCD), a hybrid CMOS/CCD sensor, a micro-bolometer array, a Silicon-Germanium array, an avalanche photo detector array, a III-V or II-VI semiconductor array, etc. Certain examples may comprise cameras configured to capture infrared wavelengths, which may enable detection of biological processes, such as heartbeats, spectral information of the skin, or pulse oxidation information, which may indicate that a live fingertip is applied to the cover glass, rather than a copy of a fingerprint, such as printed on a sheet of paper or on a simulated finger, e.g., of a mannequin), which may further enhance user authentication by ensuring the user herself is touching the cover glass. In some examples, the camera 230 may also comprise one or more lenses designed to direct and focus light rays reflected by the third side of the prism structure 220 onto an image sensor within the camera 230.

Figure 3:
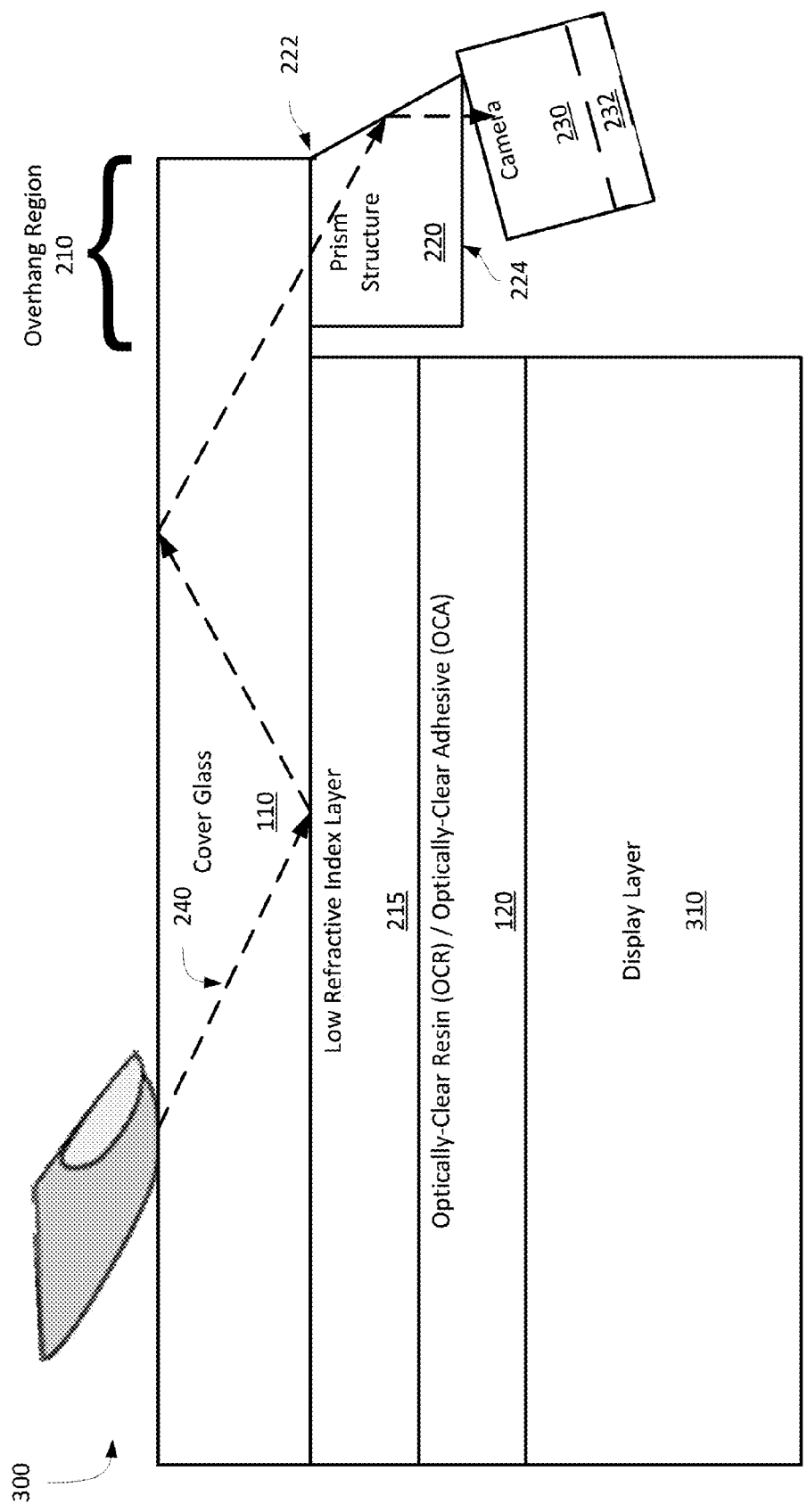

Referring now to FIG. 3, FIG. 3 shows another example of a display assembly 300. In this example, the display assembly comprises a cover glass 110 with a LRI layer 215 coupled to a display layer 310 using a suitable OCR or OCA. In this example, the display layer 310 comprises a display and may comprise additional layers not specifically shown in this figure. For example, the display layer 310 may comprise the touch input layer 130 of FIG. 2 coupled to the display using an OCR or OCA as discussed above. In some examples, other or different layers may be incorporated into the display layer 310, such as in-cell or on-cell capacitive touch input layers, optically-based touch input layers, such as described in U.S. patent application Ser. No. 14/626,679, filed Feb. 19, 2015, titled "Large Area Interactive Display Screen," polarizing layers, filter layers, etc. Thus, the display layer 310 represents the portion of the assembly sitting beneath the LRI layer 215, which may include any number of layers of varying types and functions. It should be noted that the layers of FIGS. 2 and 3 are not shown to scale.

In this example, as discussed above with respect to FIG. 2, the camera 230 is positioned such that its image sensor 232 is oriented to receive light propagating through the prism structure 220 from the cover glass 110. However, in this example, rather than being oriented such that the image sensor 232 is in a plane parallel to the second surface 222 of the prism structure 220, the camera 230 and image sensor 232 are angled with respect to the second surface 222 of the prism structure. In this example, they are angled at approximately 5 degrees from parallel with the second surface 222 of the prism structure 220, however, as discussed above with respect to FIG. 2, the image sensor 232 may be angled at up to 20 degrees from parallel with the second surface 222 of the prism structure 220. The example display assembly 300 of FIG. 3 may provide for a display that can authenticate a person, but not accept touch-based input.

Figure 4:
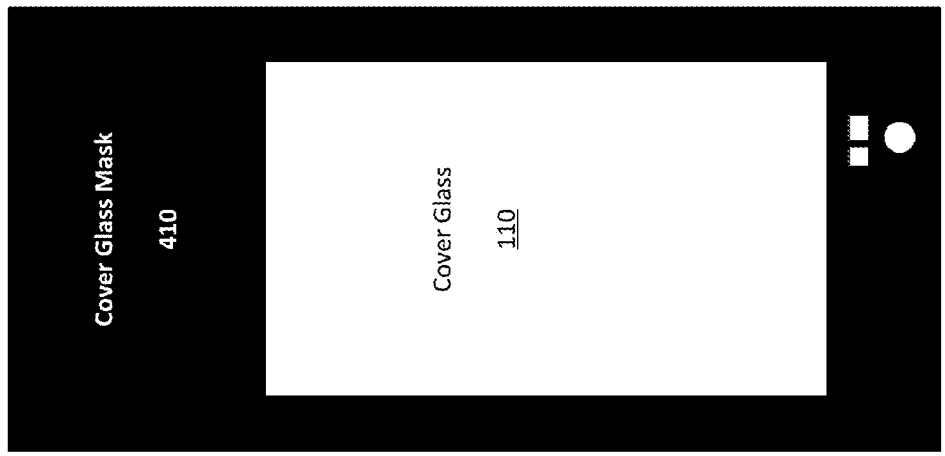
Figure 4:
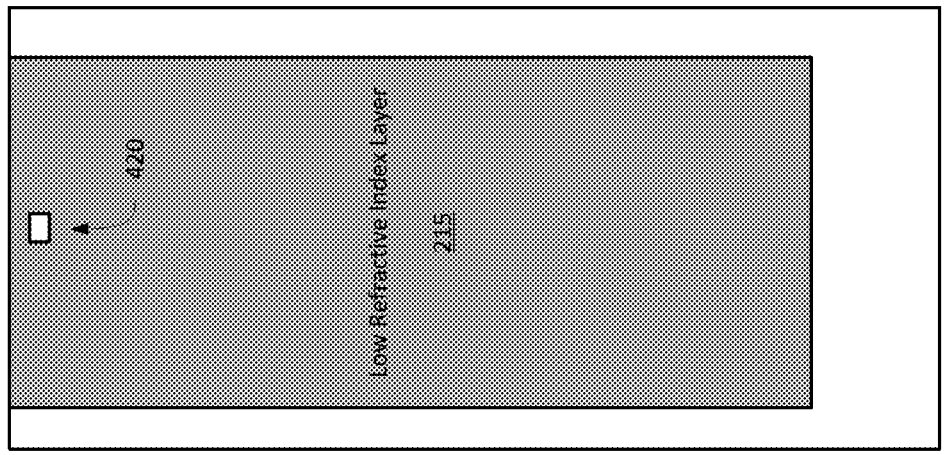

Referring now to FIG. 4, FIG. 4 shows an example display assembly for cover-glass optical isolation for optical touch and fingerprint sensing according to the present disclosure. FIG. 4 illustrates a top view of a cover glass 110 that has a cover glass mask 410 applied to it. A cover glass mask 410 may be applied to the cover glass 110 to mask out parts of the cover glass that do not correspond to a display. As can be seen in the example cover glass 110 in FIG. 4, a portion of the cover glass 110 has been masked with an opaque material while retaining full transparency within a central rectangular region.

FIG. 4 also shows the LRI layer 215, which is applied to the cover glass; however, has been shown separately for illustrative purposes. The LRI layer 215 in this example will only cover a portion of the cover glass 110. In this example, the LRI layer 215 is sized to correspond to the rectangular region of the cover glass 110 and to extend to the edge of the cover layer to enable coupling with the prism structure 220. As can be seen, the LRI layer 215 is not applied to a prism region 420 where the prism structure 220 couples to the cover glass to allow light propagating within the cover glass to propagate into the prism structure 220. In this example, the prism region 420 has a rectangular shape; however other suitable shapes and sizes may be employed in other examples. For example, the prism region 420 may extend the full width of the LRI Layer 215, or may include multiple discrete prism regions 420, each coupled to a prism structure oriented to direct light towards the same or different cameras 230.

Figure 5:
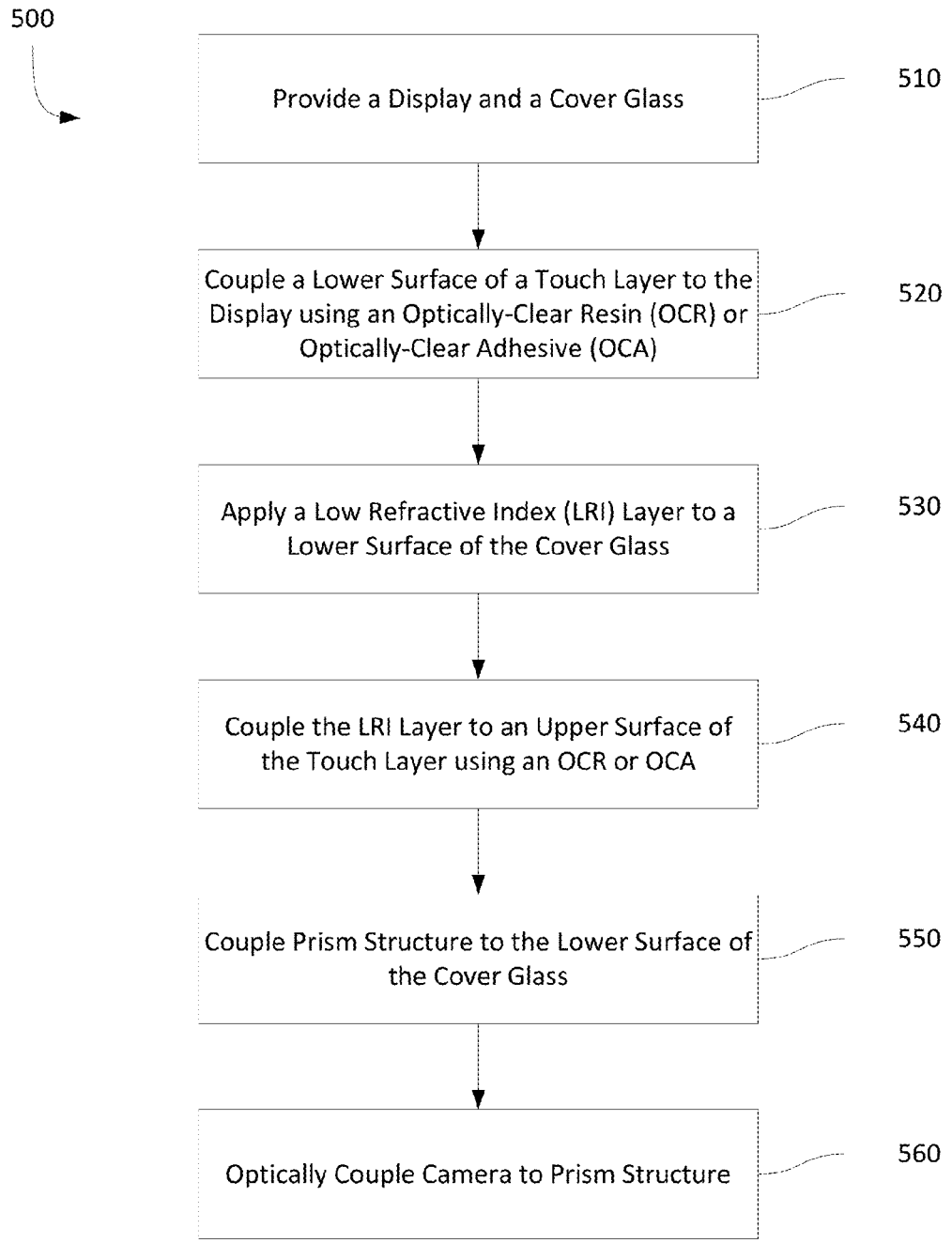
FIG. 5 shows an example method of manufacturing a display assembly according to the present disclosure.

Referring now to FIG. 5, FIG. 5 shows an example method 500 of manufacturing a display assembly according to the present disclosure. The method 500 will be discussed with respect to the example display assembly of FIG. 2, and begins at block 510.

At block 510, a display layer 150 and a cover glass 110 are provided for use in the manufacturing process for the display assembly. In this example, the display layer 150 comprises an active matrix organic light-emitting diode (AMOLED) display sized for use within a handheld device; however, displays using other display technologies may be used, such as various types of LCD displays (e.g., thin film transistor (TFT) LCDs, in-plane switching (IPS) LCD displays, other OLED displays, etc.). Further, a display according to this disclosure may be of any suitable size based on the intended application. For example, as discussed above, a suitable display may be sized for a handheld device, such as a smartphone, a flip-phone, a tablet device, a laptop, e-reader, etc. In some examples, a suitable display may be sized for larger devices, such as computer monitors or televisions.

A suitable cover glass for different examples according to this disclosure comprises a transparent material sized to be overlaid on a corresponding display to be used in the display assembly. A cover glass 110 may be made from any suitable material, such as glass, quartz, sapphire glass, Gorilla® Glass, etc.

At block 520, a lower surface of a touch input layer 130 is coupled to the display layer 150 using an OCR or OCA material. Some example touch input layers comprise sensors configured to detect contact or proximity to the sensor. One example touch input layer comprises a capacitive touch input layer, however, other suitable touch input layers may be used in various examples, such as resistive touch input layers, surface acoustic wave touch input layers, a surface capacitance layer, a projected capacitive touch input layer, an infrared grid touch input layer, or any other suitable means for touch input. In some examples, the touch input layer may comprise an optically-based touch input layer. Suitable example OCR or OCA materials include silicone adhesives, liquid optically-clear adhesives, epoxies, urethanes, silicones, cyanoacrylates, or polyester resin based materials, as well as other discussed throughout this disclosure.

At block 530, a LRI layer 215 is coupled to a lower surface of the cover glass 110. A suitable LRI material may be applied to create the LRI layer 215. Any suitable LRI materials may be employed, including those discussed above. Techniques for applying the LRI material to the cover glass 110 include applying the LRI material using a tape or by lamination or by dip coating or spin-on coating. For example, a suitable tape may comprise a silicone adhesive. Further, the size or different dimensions of a display assembly may affect the application of the LRI layer. For example, an LRI layer for a display assembly sized for a handheld device may be applied using a dip coating or spin-on coating, while an LRI layer for a larger display, such as for a computer monitor or television, may be applied using a silicone adhesive.

At block 540, the LRI layer 215 is coupled to an upper surface of the touch input layer 130 using an OCR or OCA layer 120. As discussed above, suitable LRI materials may be applied to a surface using various techniques, such as applying a tape or laminate, or dip or spin coating, and various touch input layers 130 and OCA and OCR layers were discussed above.

At block 550, a prism structure 220 is coupled to the lower surface of the cover glass 110. In this example, the prism structure 220 is coupled to the lower surface of the cover glass 110 by applying an OCR or OCA between the cover glass 110 and the prism structure 220.

At block 560, a camera 230 is optically coupled to the prism structure 220. "Optically-couple" is used to indicate that while in some examples, the camera 230 may be permanently coupled to the prism structure, e.g. using an OCR or OCA, in some examples, the camera 230 may be positioned such that light may be directed by the prism structure 220 onto the camera 230, e.g., onto a lens of the camera 230, which then directs the light onto the camera's sensor. For example, a camera 230 may be positioned adjacent to a second surface 224 of the prism structure 220, the camera 230 comprising an image sensor, and orienting the camera 230 to position the image sensor in a plane substantially parallel to a plane of the second surface 224 of the prism structure 220 and to capture light propagating through the second surface 224 of the prism structure 220. In one such example, the camera 230 is not positioned in contact the prism structure, while in some examples, the camera 230 and the prism structure 220 may be positioned within a device such that they are in contact with each other, but are not permanently coupled, e.g., with an OCA or OCR. In some examples, as discussed above, the image sensor 232 (or camera 232) may be oriented at an angle offset from parallel to the second surface 224 of the prism structure, such as up to 20 degrees from parallel.

After each of blocks 510-560 have been performed, the resulting display assembly may be installed within a computing device, such as a handheld device, computer monitor, television, or other suitable computing device.

While the steps of method 500 were described in a particular order, no specific ordering of the steps is required. Still further orderings, including repeating one or more steps, or including one or more layers of a particular type. For example, as discussed above, example display assemblies may comprise a plurality of touch input layers, and thus an example method may further include a step of coupling the touch input layers to each other or to other components using OCR or OCA layers. Further, as shown in FIG. 3, an example display assembly may not include a touch input layer 130, and thus the method 500 of FIG. 5 may not include block 520, while block 540 may instead involve coupling the LRI layer 215 to an upper surface of the display 310 using an OCR or OCA. Further, in some examples, the prism structure 220 may be integrated with the camera 230. Thus, in some examples, block 560 may be performed prior to block 550.

Figure 6:
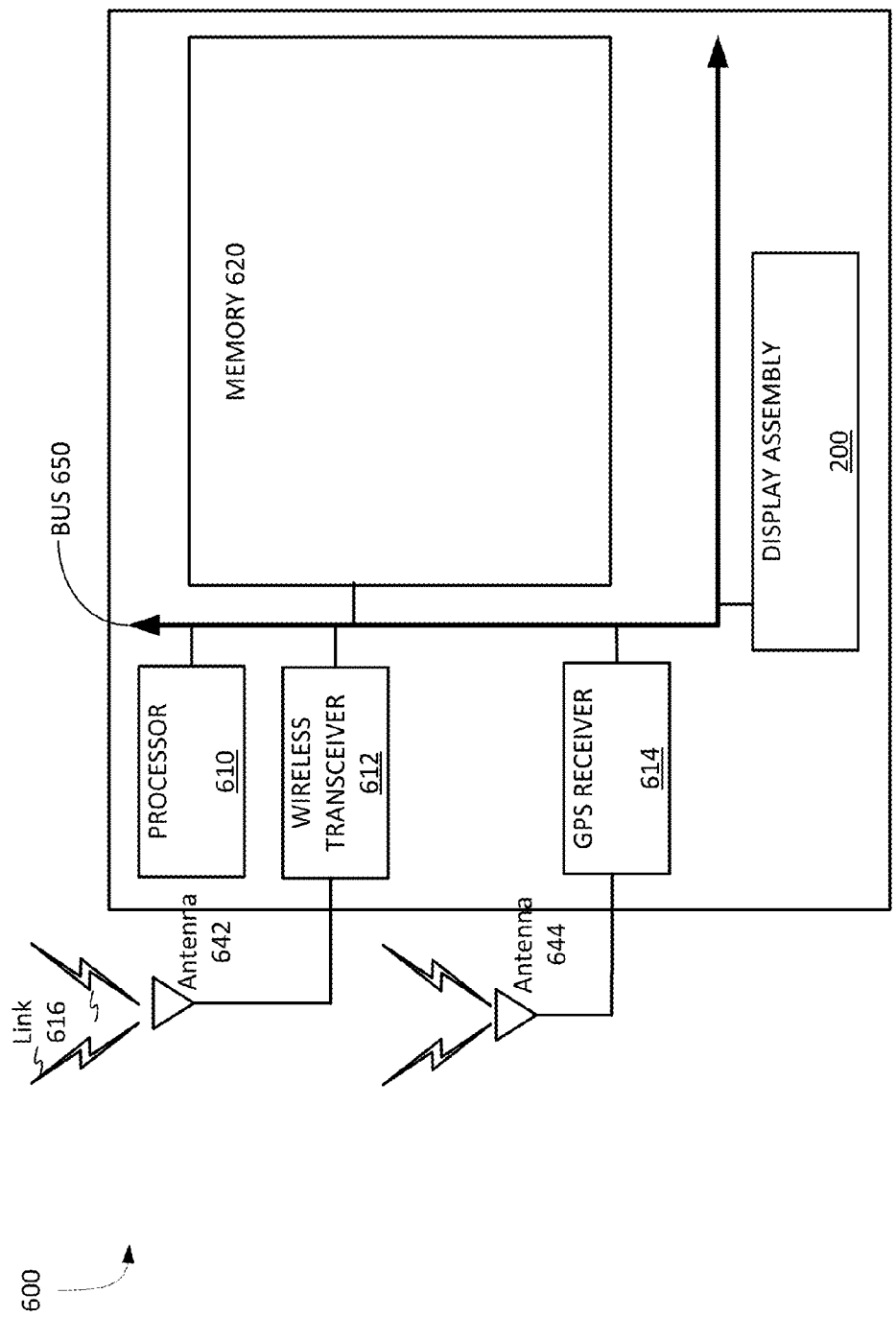
FIGS. 6-7 shows an example of a computing system suitable for use with one or more example display assemblies for cover-glass optical isolation for optical touch and fingerprint sensing according to the present disclosure.

Referring now to FIG. 6, FIG. 6 an example of a computing system 600 suitable for use with one or more example display assemblies for cover-glass optical isolation for optical touch and fingerprint sensing according to the present disclosure.

FIG. 6 shows an example mobile wireless device 600. In the example shown in FIG. 6, the mobile device 600 includes a processor 610, a memory 620, a wireless transceiver 612, a Global Navigation Satellite System ("GNSS") receiver (e.g., a Global Positioning System ("GPS") receiver) 614, a display assembly 200, and a bus 650. In this example, the mobile device comprises a cellular smartphone, but may be any suitable device, include a cellular phone, a laptop computer, a tablet, a phablet, a personal digital assistant (PDA), wearable device, or augmented reality device. The processor 610 is configured to employ bus 650 to execute program code stored in memory 620, to output display signals to the display assembly 200, and to receive input signals from the display assembly 200. In this example, the display assembly 200 comprises the example display assembly 200 shown in FIG. 2. However, any suitable display assembly according to this disclosure may be employed in different example mobile wireless devices, such as wireless device 600.

In addition, the processor 610 is configured to receive information from the GPS receiver 614 and wireless transceiver 612 and to transmit information to the wireless transceiver 612. The wireless transceiver 612 is configured to transmit and receive wireless signals via antenna 642 using link 616. For example, the wireless transceiver may be configured to communicate with a cellular base station by transmitting signals to and receiving signals from an antenna associated with the cellular base station. The GPS receiver 614 is configured to receive signals from one or more GPS satellites and to provide location signals to the processor 610.

Figure 7:
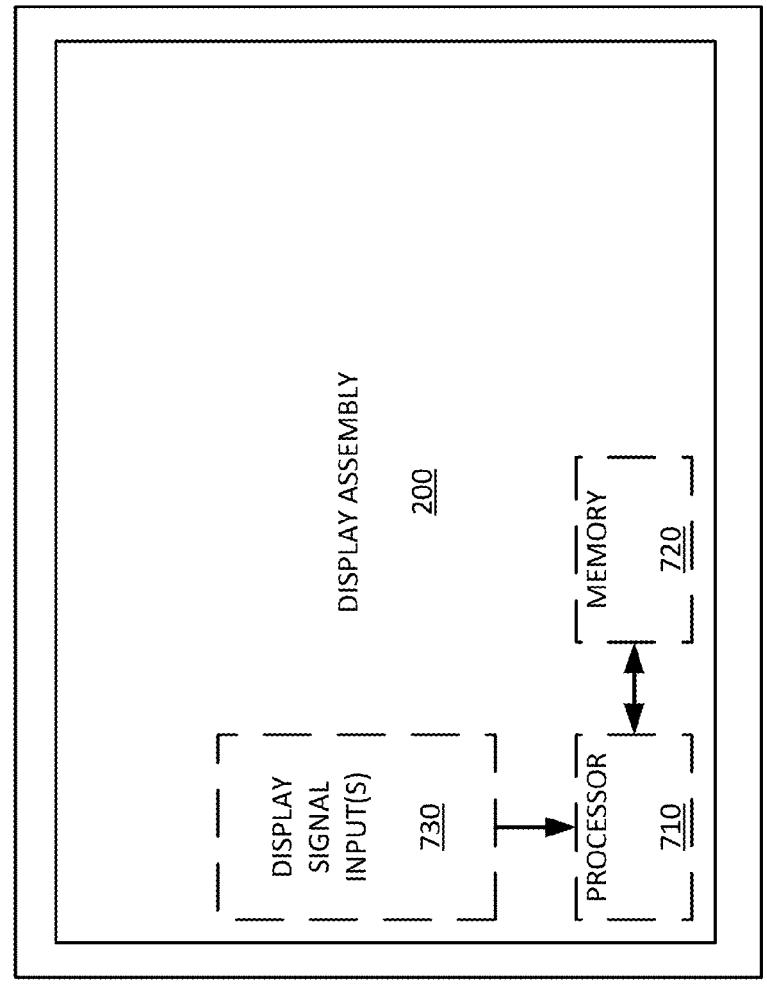

Referring now to FIG. 7, FIG. 7 an example of a computing system suitable for use with one or more example display assemblies for cover-glass optical isolation for optical touch and fingerprint sensing according to the present disclosure.

FIG. 7 shows an example television 700. In this example, the television 700 comprises a display assembly 200, a processor 710, a memory 720, and one or more display signal inputs 730. In this example, the display assembly 200 comprises the example display assembly 200 shown in FIG. 2. However, any suitable display assembly according to this disclosure may be employed in different example computing devices, such as television 700, other televisions, or computer monitors. The display signal input(s) 730 comprise one or more inputs for receiving display signals, and in different examples may include one or more of an HDMI input, a DVI input, a DisplayPort input, a component video or audio input(s), a composite video or audio input(s), a coaxial input, or a network interface, such as Ethernet, Wi-Fi, Bluetooth, USB, cellular, etc.

The processor 710 comprises or is in communication with a computer-readable medium, such as memory 720, which may be a random access memory (RAM) coupled to the processor. The processor 710 executes computer-executable program instructions stored in memory 720. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, such as memory 720, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

Figure 8:
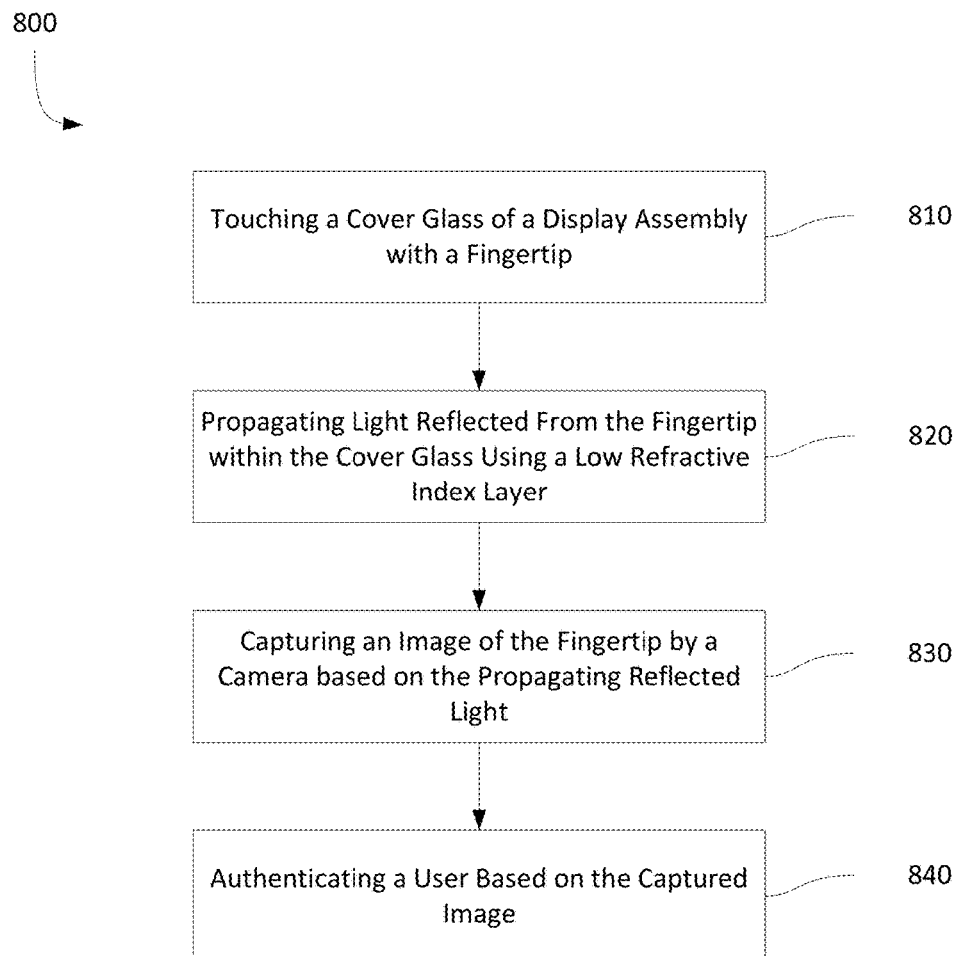
FIG. 8 shows an example method of authenticating a user using an example display assembly according to this disclosure.

Referring now to FIG. 8, FIG. 8 shows an example method of authenticating a user using an example display assembly according to this disclosure. The method 800 of FIG. 8 will be discussed with respect to the computing device 600 shown in FIG. 6; however, it should be appreciated that other example computing devices according to this disclosure may be used to perform this and other example methods. The method 800 of FIG. 8 begins at block 810.

At block 810, a user touches the cover glass 110 of a display assembly 200 with one or more fingertips. For example, the user may touch the cover glass of a display assembly 200 in her smartphone or in her television 700.

At block 820, light reflects from the user's fingertip back into the cover glass 110 and propagates within the cover glass by reflecting from inner surfaces of the cover glass 110 using the LRI layer 215, which allows a greater amount of reflected light rays to propagate within the cover glass 110.

At block 830, the camera 230 captures one or more images of the user's fingertip based on light propagating through the cover glass 110 into the prism structure 220 and onto the camera's sensor.

At block 840, the captured image is analyzed to extract one or more finger print patterns (e.g., arches, loops, whorls, etc.) and minutiae features (e.g., ridge endings, ridge bifurcations, short ridges, etc.), and compare the extracted data with information corresponding to one or more fingerprints in a database to identify a match (or a match failure) to authenticate a user.

Example devices and systems according to this disclosure may include one or more processors. Suitable processors may include a computer-readable medium, such as a random access memory (RAM), coupled to the processor. The processor may execute computer-executable program instructions stored in memory, such as executing one or more computer programs. Suitable processors may include a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A display assembly comprising:
   a cover glass layer;
   a low refractive index (LRI) layer coupled to a surface of the cover glass layer;
   a display layer coupled to the LRI layer;
   a prism structure; and
   a camera comprising an image sensor optically coupled to the prism structure to capture an image of a fingerprint based on light reflected from a fingertip and propagated within the cover glass layer and directed towards the camera using the prism structure,
   wherein the cover glass layer defines an overhang region that extends beyond the LRI layer and the display layer, and wherein the prism structure is coupled to the surface of the cover glass layer on the overhang region.

2. The display assembly of claim 1, wherein the display layer comprises:
   a touch input layer coupled to the LRI layer; and
   a display coupled to the touch input layer.

3. The display assembly of claim 2, wherein the touch input layer comprises a capacitive touch sensor or a projected capacitive touch sensor.

4. The display assembly of claim 1, wherein the display layer is coupled to the LRI layer by an optically-clear resin ("OCR") or an optically-clear adhesive ("OCA").

5. The display assembly of claim 1, wherein the cover glass layer has a first refractive index and the LRI layer has a second refractive index lower than the first refractive index.

6. The display assembly of claim 5, wherein a difference between the first and second refractive indices is at least approximately 0.09.

7. The display assembly of claim 5, wherein the second refractive index is between approximately 1.30 and 1.41.

8. An apparatus comprising:
   means for propagating light within a display assembly;
   means for capturing an image based on light received from the means for propagating light within a display assembly;
   means for directing light onto the means for capturing an image coupled to a surface of an overhang region of the means for propagating light; and
   a means for displaying coupled to the means for propagating light.

9. The apparatus of claim 8, further comprising means for touch input coupled to the means for propagating light.

10. The apparatus of claim 8, further comprising a means for touch input.

11. The apparatus of claim 10, wherein the means for touch input comprises a capacitive touch sensor or a projected capacitive touch sensor.

12. The apparatus of claim 8, wherein the means for propagating light comprises:
 a cover glass means; and
 a low refractive index (LRI) means coupled to a surface of the cover glass means.

13. The apparatus of claim 12, wherein the means for directing light is coupled to a surface of the cover glass means.

14. The apparatus of claim 12, wherein the cover glass means has a first refractive index and the LRI means has a second refractive index lower than the first refractive index.

15. The apparatus of claim 14, wherein a difference between the first and second refractive indices is at least approximately 0.09.

16. The apparatus of claim 14, wherein the second refractive index is between approximately 1.30 and 1.41.

17. The apparatus of claim 8, wherein the means for displaying is coupled to the means for propagating light by an optically-clear resin ("OCR") or an optically-clear adhesive ("OCA").

18. A method for forming a display assembly, comprising providing a display and a cover glass;
 applying a low refractive index (LRI) layer to a first portion of a surface of the cover glass;
 coupling the display to the LRI layer using at least one of an optically-clear resin (OCR) or an optically-clear adhesive (OCA), wherein coupling the display to the LRI layer defines an overhang region of the cover glass;
 coupling a first surface of a prism structure to the surface of the cover glass on the overhang region;
 positioning a camera adjacent to a second surface of the prism structure, the camera comprising an image sensor, and
 orienting the camera to position the image sensor in to capture light propagating through the second surface of the prism structure.

19. The method of claim 18, further comprising coupling the display assembly to a computing device.

20. The method of claim 18, wherein coupling the display to the LRI layer comprises coupling the display to a touch input layer and coupling the touch input layer to the LRI layer.

21. The method of claim 18, wherein applying the LRI layer comprises one of applying a tape or lamination layer or by using dip coating or spin-on coating process.

22. The method of claim 18, wherein the cover glass has a first refractive index and the LRI layer has a second refractive index lower than the first refractive index.

23. The method of claim 22, wherein a difference between the first and second refractive indices is at least approximately 0.09.

24. The method of claim 22, wherein the second refractive index is between approximately 1.30 and 1.41.

25. A computing device comprising:
 a non-transitory computer-readable medium;
 a processor in communication with the non-transitory computer-readable medium; and
 a display assembly in communication with the processor, the display assembly comprising:
  a cover glass layer;
  a low refractive index (LRI) layer coupled to a surface of the cover glass layer;
  a display layer coupled to the LRI layer;
  a prism structure; and
  a camera comprising an image sensor optically coupled to the prism structure to capture an image of a fingerprint based on light reflected from a fingertip and propagated within the cover glass layer and directed towards the camera using the prism structure,
  wherein the cover glass layer defines an overhang region that extends beyond the LRI layer and the display layer, and wherein the prism structure is coupled to the surface of the cover glass layer on the overhang region.

26. The computing device of claim 25, wherein the display layer comprises:
 a touch input layer; and
 a display coupled to the touch input layer;
 wherein the touch input layer is coupled to the LRI layer.

27. The computing device of claim 25, wherein the computing device comprises a handheld device, a computer monitor, or a television.

28. The computing device of claim 25, wherein the cover glass layer has a first refractive index and the LRI layer has a second refractive index lower than the first refractive index.

29. The computing device of claim 28, wherein a difference between the first and second refractive indices is at least approximately 0.09.

30. The computing device of claim 28, wherein the second refractive index is between approximately 1.30 and 1.41.

\* \* \* \* \*